E. GONZENBACH.
ENGINEER'S VALVE.
APPLICATION FILED MAY 20, 1907.
990,976.
Patented May 2, 1911.
2 SHEETS—SHEET 1.
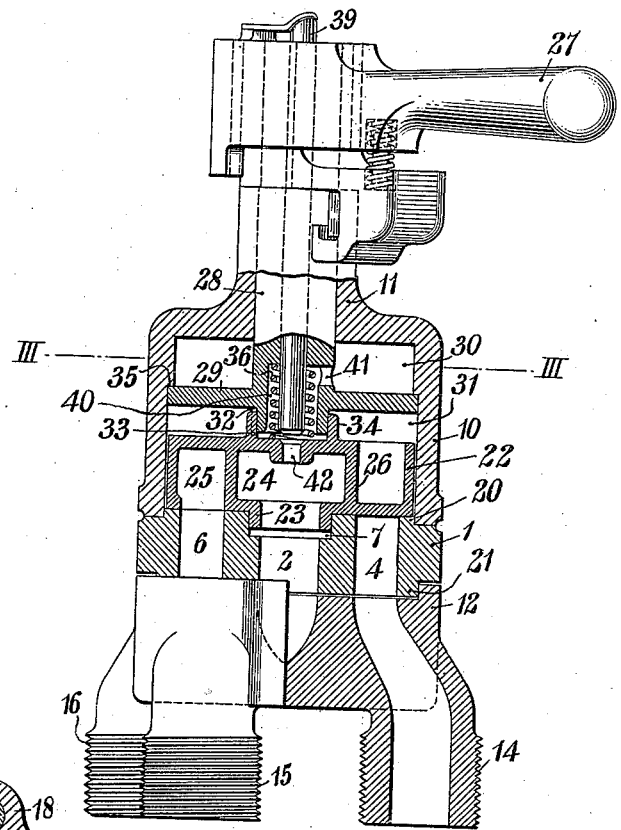
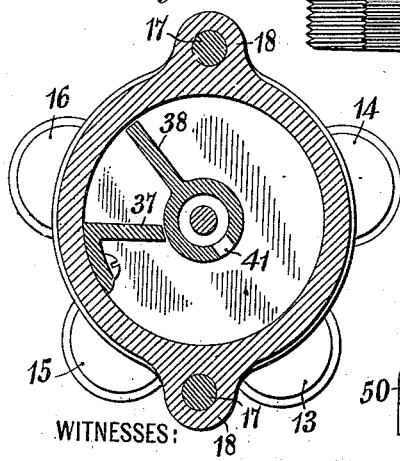
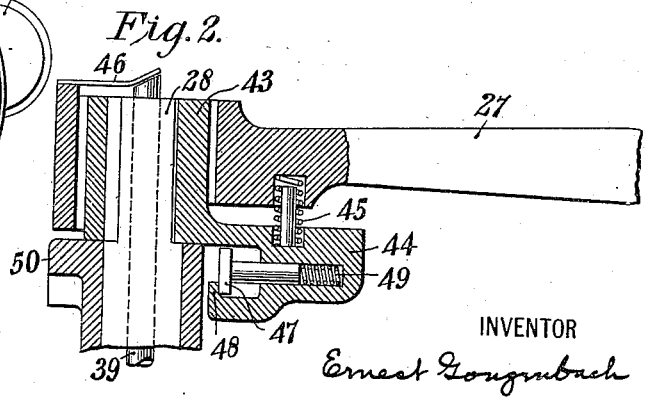
WITNESSES:
INVENTOR
Ernest Gonzenbach
BY
ATTORNEY E. GONZENBACH.
ENGINEER'S VALVE.
APPLICATION FILED MAY 20, 1907.
990,976.
Patented May 2, 1911.
2 SHEETS—SHEET 2.
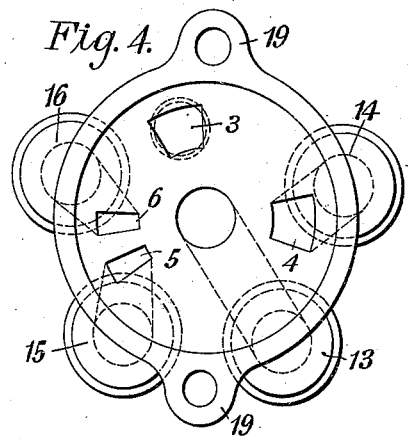
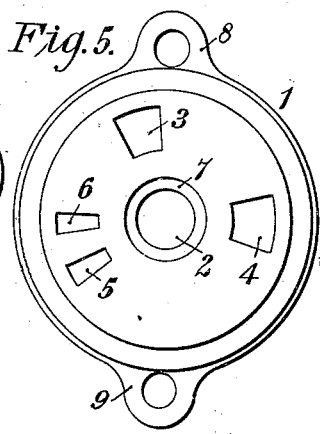
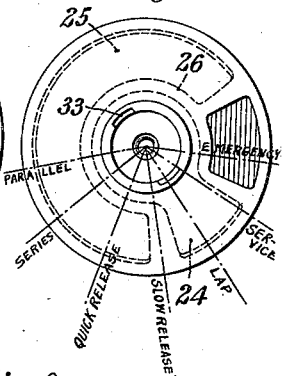
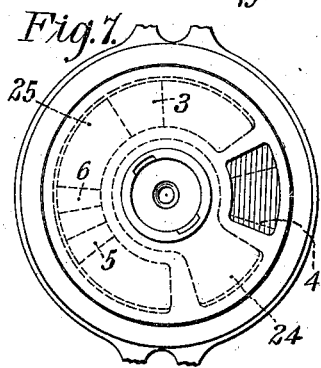
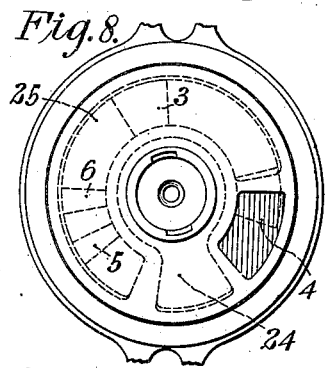
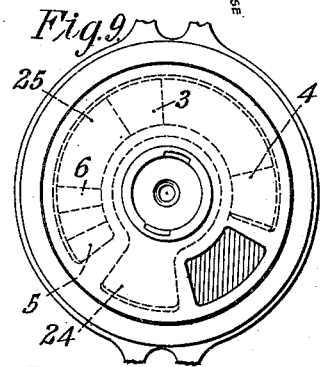
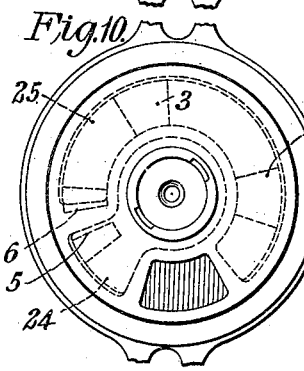
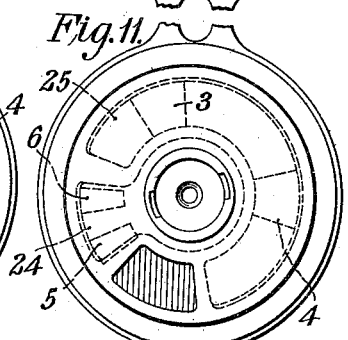
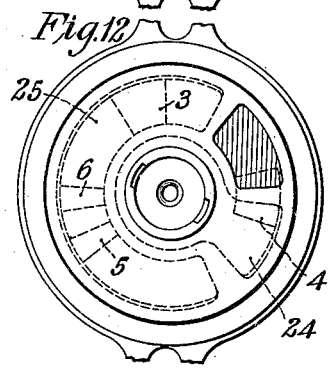
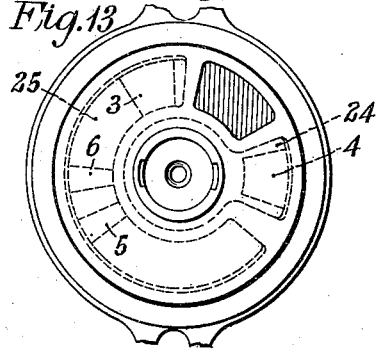
WITNESSES:
C. L. Belcher
R. J. Dearborn
INVENTOR
Ernest Gonzenbach
BY
Wesley G. Carr
ATTORNEY

UNITED STATES PATENT OFFICE.

ERNEST GONZENBACH, OF GREENSBORO, NORTH CAROLINA, ASSIGNOR TO WESTINGHOUSE ELECTRIC & MANUFACTURING COMPANY, A CORPORATION OF PENNSYLVANIA.

ENGINEER'S VALVE.

990,976.   Specification of Letters Patent.   Patented May 2, 1911.

Application filed May 20, 1907. Serial No. 374,738.

*To all whom it may concern:*

Be it known that I, ERNEST GONZENBACH, a citizen of the United States, and a resident of Greensboro, in the county of Guilford and State of North Carolina, have invented a new and useful Improvement in Engineers' Valves, of which the following is a specification.

My invention relates to the multi-way valves and has special reference to engineers' valves for governing the acceleration and retardation of railway vehicles or trains of vehicles.

The object of my invention is to provide a simple and compact multi-way or engineer's valve which shall embody automatic means for returning the valve to a predetermined position when it is released in any other position which it is adapted to occupy.

The device of my present invention may be advantageously employed for governing pneumatically operated controllers for electrically driven vehicles and also for controlling the admission of fluid pressure to the brake cylinders and it consequently combines, in a single, relatively simple device, a well known engineer's brake valve and a master control switch.

Master switches or controllers are often so arranged that it is necessary for the engine driver or motorman to constantly exert a material mechanical force in order to hold the control drum in any other than its "off" position. The advantages of this arrangement are well known and, in my improved engineer's valve, other advantages are gained, since a relatively sensitive means is provided whereby the engine driver or attendant exerts an inappreciable force when the valve occupies any other than a predetermined position in which not only the supply of energy to the vehicle is interrupted but the brakes are also applied.

My invention is illustrated in the accompanying drawings in which—

Figure 1 is a view partially in elevation, but mainly in section, of an engineer's valve constructed in accordance therewith. Fig. 2 is a sectional elevation of the handle lever of Fig. 1. Fig. 3 is a sectional plan view on a line III—III of Fig. 1, and Figs. 4, 5, and 6 are detail views of the stationary and movable valve members. Figs. 7, 8, 9, 10, 11, 12, and 13 are plan views showing the relation between the stationary and movable valve members in a plurality of positions which the device is adapted to occupy in service.

Referring to the drawings, the device, here illustrated, comprises a stationary member 1 having a central port or passage way 2 and a plurality of other passages 3, 4, 5, and 6, a counter-bore 7 and laterally projecting lugs 8 and 9. A stationary casing 10 having a bearing projection 11 and a stationary cap 12, which is provided with a plurality of plugs 13, 14, 15, and 16, are secured to the intermediate member 1, by means of bolts 17 that project through the holes in the lugs 8 and 9 and corresponding holes in the lugs 18 and 19 with which members 10 and 12 are provided. The plugs 13, 14, 15, and 16 respectively communicate with ports 2, 4, 5, and 6 while the port 3 is an exhaust port and communicates directly with the outside atmosphere. The surfaces of the member 1 are provided with annular grooves which form cylindrical projections 20 and 21 that are carefully fitted into the members 10 and 12 in order to form a tight joint between them.

A valve member 22 is rotatably mounted on the stationary member 1 and is provided with a cylindrical projection 23 which engages the counter-bore 7 and is divided into chambers 24 and 25 by means of a partition 26 which is partially annular and partially radial. The valve member 22 may be rotated by means of a valve stem 28 and a handle lever 27. The valve stem 28 is mounted in the bearing projection 11 and is provided with a flange 29 which divides the interior of the casing 10 into two chambers 30 and 31. The valve stem is further provided with key projections 32 that engage key ways 33 in a cylindrical projection 34 on the valve member 22. By this means the valve member 22 and the stem 28 are locked together against independent rotative movement, while a limited longitudinal movement of the valve relative to the stem, is permitted. The longitudinal movement of the stem is limited in one direction by the engagement of the flange 29 with a shoulder 35 on the casing 10 and the valve member 22 is firmly seated against the member 1 by means of a spring 36 which is interposed between the stem and the valve.

The casing 10 is provided with a radial projection 37 which extends into the chamber 30 and the valve stem 28 is provided with a similar radial piston 38. The stem 28 is bored out to receive a loosely fitting pin 39 and the extremity of the stem which engages the valve member 22 is counterbored to form a chamber 40 in which the spring 36 is located. A relatively small port or passage way 41 establishes a communication between the chamber 40 and the chamber 30 and a centrally located port 42 connects the chamber 24 with the chamber 40. The pin 39 is adapted to close the port 42, under normal conditions, as hereinafter explained. A bushing 43 is secured to the outer extremity of the valve stem 28 and is provided with a pawl-bearing projection 44. The handle lever 27 is loosely mounted upon the bushing 43, and is normally held substantially horizontal by means of a spring 45 interposed between the projection 44 and the handle. The handle is also provided with a projection 46 which is adapted to engage the outer extremity of the pin 39 and cause it to close the port 42 when the handle lever is tilted downwardly in opposition to the spring 45. The projection 44 supports a pawl 47 which is forced against a lug 48 by a spring 49. The bearing projection 11 on the casing 10 is provided with a projection which is arranged to accentuate a predetermined position of the valve 22 by its engagement of the pawl 47.

In order to set forth the operation of the device, it will be assumed that the plug 13 is connected to a pneumatic storage tank or reservoir; that the plug 14 is connected to a brake cylinder and that plugs 15 and 16 are connected to a pneumatically operated controller for electric motors, the plug 15 representing a series relation of the motors corresponding to a relatively low speed, and the plug 16 representing a parallel relation of the motors corresponding to a relatively high speed. It will also be assumed that the relation of the valve member 22 to the stationary member 1 is as shown in Fig. 7; and that the port 42 is closed by reason of the weight of the engine driver's hand on the handle lever 27. Under these conditions, the port 2 is closed since the chamber 24, with which it communicates, and the port 4 are blanked and the pressure existing in the brake cylinder is maintained. This position is marked "lap" in Fig. 6 and is occupied by the control valve when a vehicle or train is stopped on a grade. When the valve is moved to a position marked "slow release" in Fig. 6, the existing relations are shown in Fig. 8, the only change from Fig. 7 being that the chamber 25 provides a small opening from the port 4 to the exhaust port 3. In the next position marked "quick release", the port 4 is entirely opened to the exhaust port 3 and consequently the brake cylinder or other pressure chambers supplied through port 4 are exhausted. In Fig. 10 the valve has been moved to occupy a position marked "series" in Fig. 6 in which communication is established from the admission port 2 through the chamber 24 to the port 5 and in the next position marked "parallel" in Fig. 6, communication is also established from port 2 to the port 6. The latter position corresponds to the full-speed running position of an electric vehicle and, to stop the vehicle, the valve is returned through the positions marked "series", "quick release" and "slow release" to "lap" and from this position is moved in the opposite direction to the position marked "service" in Fig. 6, in which the valve relations are as shown in Fig. 12, and communication is established from ports 5 and 6 to the exhaust port 3 and from the supply port 2 through the chamber 24 into the port 4 through a restricted opening. If it is necessary to stop the vehicle very suddenly, as in case of accident, the valve may be moved still farther in the same direction to a position marked "emergency" in Fig. 6, in which a free passage is established from the port 2 to the port 4, as illustrated in Fig. 13.

For the purpose of setting forth the automatic action of the valve in case it is released in some position other than the position marked "emergency," it is assumed that the valve occupies the position marked "parallel." If the handle lever is released when the valve is in this position, the pin 39 will be raised by the fluid-pressure exerted upon it and an opening will be provided through the valve 42 and the passage-way 41 into the chamber 30. The pressure in this chamber will act against the radial piston 38 and will cause the valve stem 28 and the valve member 22 to rotate until said projection comes into engagement with the stationary radial projection 37. Before this position is occupied, the valve passes successively through the positions marked "series," "quick release," "slow release," "lap" and "service" into the position marked "emergency," in which a free passage is established from the inlet port 2 to the port 4 which communicates with the brake cylinder. If the handle lever is released in any position which the valve may occupy, except that marked "emergency," the valve 42 will be opened in a similar manner and the valve member 22 will be immediately returned to the emergency position. It will be readily understood by those skilled in the art that, throughout the normal operation of the device, the hand of the engineer or attendant exerts a downward pressure on the lever and, consequently, the valve 42 is closed.

Although the multi-way valve of my present invention is well adapted to control the acceleration and retardation of electric-motor-propelled vehicles, it is, of course, not restricted to this use and I desire that structural variations and adaptations which do not depart from the spirit of my invention shall be included within its scope.

I claim as my invention:

1. An engineer's valve comprising an inlet port, a plurality of outlet ports, a rotatable valve member, a handle lever therefor, an auxiliary valve member, and means dependent upon the auxiliary valve member for returning the rotatable valve member to a predetermined position when it is released in any other position.

2. An engineer's valve comprising an inlet port, a plurality of outlet ports, a rotatable valve member, a handle lever therefor, and pneumatically operated means for returning the movable valve member and operating handle lever to a predetermined position when they are released in any other position.

3. In an engineer's valve having an inlet port and a plurality of outlet ports, the combination with a rotatable valve member for selectively connecting the outlet ports with the inlet port, and an operating handle lever for the rotatable valve member, of an auxiliary chamber, a radial piston within said chamber and connected to said valve member, and means for admitting air to said chamber to operate said piston when the handle lever is released.

4. In an engineer's valve, the combination with a pneumatic supply conduit, a plurality of outlet conduits, a rotatable member for selectively completing communication between the supply and outlet conduits, of a handle lever and an auxiliary valve member for controlling the position of the rotatable valve member.

5. In an engineer's valve, the combination with a pneumatic supply conduit, a plurality of outlet conduits, and a rotatable member for selectively completing communication between the supply and outlet conduits, of a handle lever and means for manually and pneumatically controlling the position of the rotatable valve member.

6. In an engineer's valve having a plurality of ports, the combination with a rotatable valve member which selectively interconnects the ports, of automatic means comprising an auxiliary valve member for returning the rotatable valve member to a predetermined position after it has been moved from said position.

7. In an engineer's valve having a plurality of ports, the combination with a rotatable valve member which selectively interconnects the ports, of pneumatically operated means for returning the rotatable valve member to a predetermined position after it has been moved from said position.

8. In an engineer's valve having a plurality of ports, the combination with a rotatable valve member which selectively interconnects the ports, and a handle lever for manually operating said member, of pneumatically operated means for returning the movable valve member and the operating handle to a predetermined position when the handle lever is released in any other position.

9. In an engineer's valve having a plurality of ports, the combination with a rotatable valve member which selectively interconnects the ports, an operating stem for said valve member, a chamber through which said stem extends, a radial piston projecting from the stem into said chamber, and a control valve which connects one of the ports with said chamber, of a handle lever which is attached to the stem and governs both the rotatable valve member and the control valve.

10. In an engineer's valve having an inlet port and a plurality of outlet ports, the combination with a rotatable valve member for selectively connecting the outlet ports with the inlet port, and an operating lever for the rotatable valve member, a hollow valve stem connecting the rotatable valve member and the handle lever, and a chamber through which the valve stem extends, of a radial piston projecting from the valve stem into said chamber, an auxiliary inlet port for said chamber, a rod or pin loosely fitted into the hollow valve stem and adapted to close the auxiliary inlet port, and means for raising said rod or pin to open the auxiliary port when the handle lever is released.

11. In an engineer's valve having an inlet port and a plurality of outlet ports, the combination with a rotatable valve member for selectively connecting the outlet ports with the inlet port, and an operating handle lever for the rotatable valve member, a hollow valve stem connecting the rotatable valve member to the handle lever, and a chamber through which said valve stem extends, of a radial piston projecting from the valve stem into said chamber, an auxiliary inlet port for said chamber, a rod or pin loosely fitted into the hollow valve stem to close the auxiliary inlet port, and a spring for raising the rod or pin to open the auxiliary inlet port when the handle lever is released.

12. In an engineer's valve having an inlet port and a plurality of outlet ports, the combination with a rotatable valve member for selectively connecting the outlet ports with the inlet port, and a loosely mounted operating handle lever for the rotatable valve member, a hollow valve stem connecting the rotatable valve member and the handle lever, and a chamber through which said valve stem extends, of a radial piston projecting from the valve stem into said chamber, an auxiliary inlet port for said chamber, a rod or pin loosely fitted into the hollow valve stem and adapted to close the auxiliary inlet port, a projecting finger attached to the handle lever and adapted to engage the outer extremity of the rod or pin.

13. In an engineer's valve having an inlet port and a plurality of outlet ports, the combination with a rotatable valve member for selectively connecting the outlet ports with the inlet port, and a loosely mounted operating handle lever for the rotatable valve member, a hollow valve stem connecting the rotatable valve member and the handle lever, and a chamber through which said valve stem extends, of a radial piston projecting from the valve stem into said chamber, an auxiliary inlet port for said chamber, a rod or pin loosely fitted into the hollow valve stem and adapted to close the auxiliary inlet port, a projecting finger attached to the handle lever and adapted to engage the outer extremity of the rod or pin to close the auxiliary valve when an external force is applied to the handle lever.

14. An engineer's valve comprising an inlet port, a plurality of outlet ports, a rotatable valve member for connecting and disconnecting said ports, a chamber having a radial piston to actuate said rotatable valve member, a reciprocating valve member to control the admission of air to said chamber, and a single handle lever for governing both of said valve members.

15. An engineer's valve comprising a plurality of ports, a rotatable valve member, a hollow valve stem operatively connected therewith, a valve member longitudinally adjustable in the hollow stem, and a single controlling means for said valve members.

16. An engineer's valve comprising a casing having two chambers, an inlet port and a plurality of outlet ports for one chamber and a control inlet port for the other chamber, a rotatable valve member for governing the inlet and outlet ports of the first chamber, and a longitudinally movable valve member for governing the control port of the other chamber, of a single governing handle for said valve members.

17. An engineer's valve comprising a plurality of ports, a rotatable valve member therefor, a hollow valve stem operatively connected therewith, an annular flange on one end of the stem, a valve cap surrounding the valve and forming an annular chamber adjacent to said flange, a radial partition in said chamber, and means dependent upon the position of the handle lever for effecting a communication between the chamber and one of the ports.

In testimony whereof, I have hereunto subscribed my name this 16th day of May, 1907.

ERNEST GONZENBACH.

Witnesses:
 EDWARD HAMMETT,
 D. SONEBAUR.

Copies of this patent may be obtained for five cents each, by addressing the "Commissioner of Patents, Washington, D. C."